US006591537B2

(12) United States Patent
Smith

(10) Patent No.: US 6,591,537 B2
(45) Date of Patent: Jul. 15, 2003

(54) RETICLE FOR TELESCOPIC GUNSIGHT AND METHOD FOR USING

(76) Inventor: Thomas D. Smith, 7008 Landing Rd., Oklahoma City, OK (US) 73132

( * ) Notice: Subject to any disclaimer, the term of this patent is extended or adjusted under 35 U.S.C. 154(b) by 58 days.

(21) Appl. No.: 10/101,819

(22) Filed: Mar. 19, 2002

(65) Prior Publication Data

US 2002/0139030 A1 Oct. 3, 2002

Related U.S. Application Data

(63) Continuation of application No. 09/152,320, filed on Sep. 14, 1998, now Pat. No. 6,357,158.

(51) Int. Cl.[7] ................................................. F41G 1/38
(52) U.S. Cl. ............................. 42/122; 42/130; 73/167
(58) Field of Search ........................ 42/122, 130; 73/167

(56) References Cited

U.S. PATENT DOCUMENTS

| 2,807,981 A | * | 10/1957 | Barnes .......................... 33/245 |
| 3,392,450 A | * | 7/1968 | Herter et al. ................... 33/297 |
| 3,410,644 A | * | 11/1968 | McLendon .................... 124/24.1 |
| 3,431,652 A | * | 3/1969 | Leatherwood ................. 33/353 |
| 3,682,552 A | * | 8/1972 | Hartman ......................... 356/3 |
| 3,744,133 A | * | 7/1973 | Fukushima et al. ............ 33/297 |
| 3,782,822 A | * | 1/1974 | Spence ........................... 356/21 |
| 3,902,251 A | * | 9/1975 | Ross .............................. 33/298 |
| 3,948,587 A | * | 4/1976 | Rubbert ......................... 356/21 |
| 4,263,719 A | * | 4/1981 | Murdoch ....................... 33/277 |
| 4,395,096 A | * | 7/1983 | Gibson .......................... 33/297 |
| 4,403,421 A | * | 9/1983 | Shepherd ..................... 359/428 |
| 4,408,842 A | * | 10/1983 | Gibson ......................... 359/422 |
| 4,497,548 A | * | 2/1985 | Burris .......................... 359/422 |
| 4,787,739 A | * | 11/1988 | Gregory ....................... 356/21 |
| 4,833,786 A | * | 5/1989 | Shores, Sr. .................... 33/265 |
| 4,912,853 A | * | 4/1990 | McDonnell et al. ........... 33/1 B |
| 5,157,839 A | * | 10/1992 | Beutler ......................... 33/265 |
| 5,181,323 A | * | 1/1993 | Cooper ........................ 359/422 |
| 5,491,546 A | * | 2/1996 | Wascher et al. .............. 356/20 |
| 6,025,908 A | * | 2/2000 | Houde-Walter ............. 356/153 |
| 6,058,921 A | * | 5/2000 | Lawrence et al. ............ 124/87 |

OTHER PUBLICATIONS

Smith, T.D., Tactical Stress Management, 2002, DRAFT.*

* cited by examiner

Primary Examiner—Michael J. Carone
Assistant Examiner—Denise Buckley

(57) ABSTRACT

A gunsight reticle defines a system of dimensioned indicia spaced at specific separations to improve aiming accuracy of a rifle. The indicia include perpendicularly intersecting center vertical and center horizontal hairlines, and four horizontal range-marker lines disposed at specific angular separations below the horizontal hairline in bisected relationship with the center vertical hairline. Spacing of the range marker lines below the center horizontal hairline is proportional to bullet drop at selected ranges, depending upon ballistic characteristics of bullet used. Relative lengths of said range-marker bars on each side of the central vertical crosshair are proportional to a cross-wind of 10 mph at target range reflected by respective range marker. The method involves employing this reticle to determine distance to target, and using distance thus determined to ascertain a precise aiming point on the reticle. These indicia also have other useful characteristics that allow the shooter to easily mentally calculate corrections for crosswind, moving target and shooting at targets that are above or below the shooter at a significant angle.

11 Claims, 12 Drawing Sheets

(6 of 12 Drawing Sheet(s) Filed in Color)

RETICLE PLACED IN FIRST FOCAL PLANE

FIG. 2 RETICLE PLACED IN FIRST FOCAL PLANE

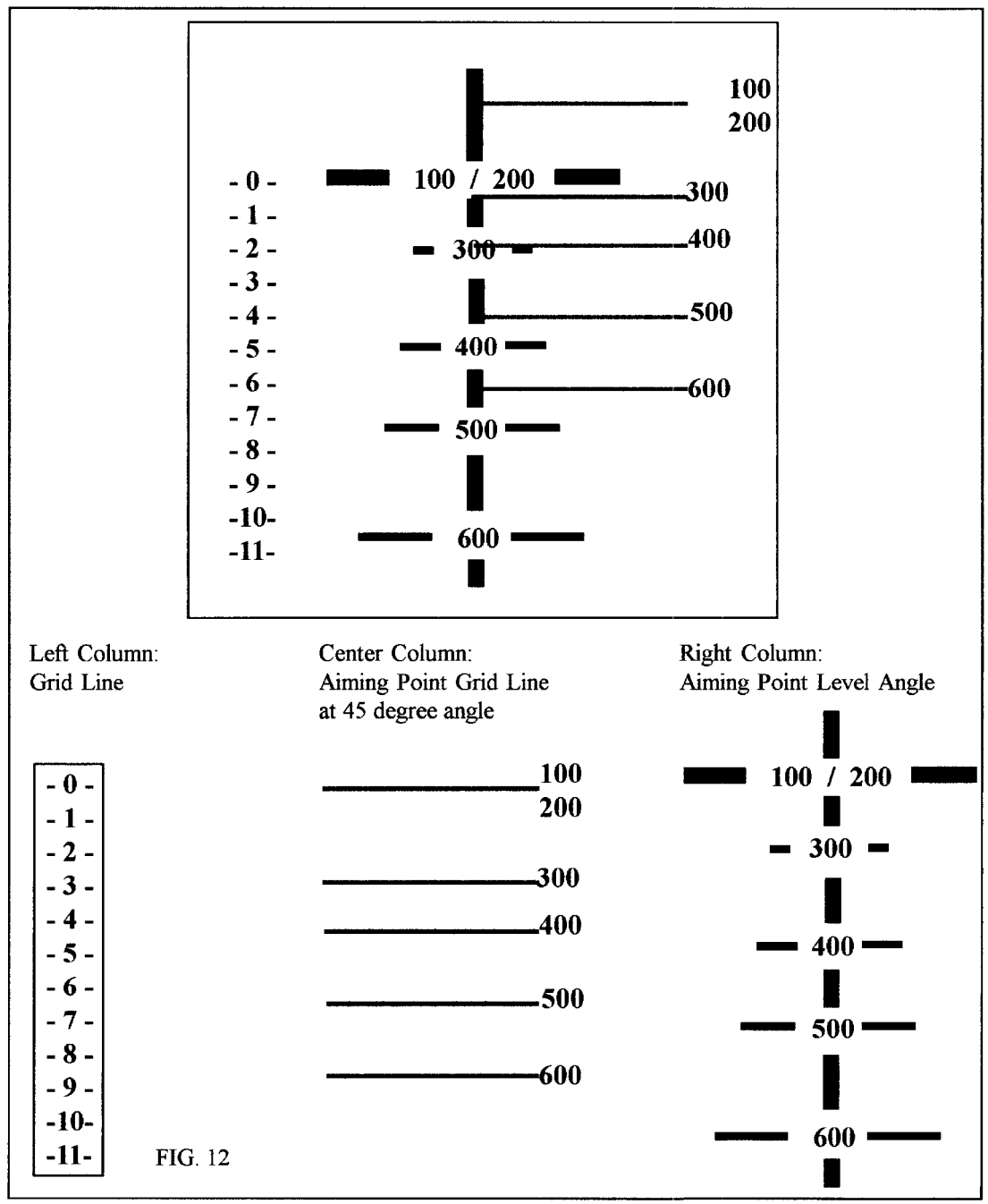
FIG. #12

RETICLE FOR TELESCOPIC GUNSIGHT AND METHOD FOR USING

This application is a continuation of application Ser. No. 09/152,320, filed Sep. 14, 1998 now U.S. Pat. No. 6,357, 158, by Thomas D. Smith III for "Reticle-Equipped Telescopic Gunsight and Aiming System,".

BACKGROUND OF THE INVENTION

1. Field of the Invention

This invention relates to telescopic rifle sights. More particularly, the invention relates to a telescopic gunsight equipped with a transparent aiming reticle and a method for using that reticle.

2. Description of the Prior Art

It is well known that the line of sight between a rifle shooter's eye and a target is a straight line, whether using "iron" sights or a telescopic sight, while the trajectory of the rifle bullet is never a straight line (when passing though a gravitational field, the trajectory follows a ballistic parabola), particularly for bullet flights over long distances. Accordingly, in order to achieve accurate shot placement, it is essential either to "sight in" the rifle for the target distance or to know both the distance from the rifle to the target and the trajectory characteristics of the bullet used. Trajectory characteristics for commercial bullets are known and are easily obtained from either the manufacturer or from trajectory charts such as the INGALLS' tables.

Telescopic gunsights, often referred to as "scopes," generally contain a transparent flat disk reticle positioned in a plane perpendicular to the line of sight through the scope. The reticle conventionally has a single vertical crosshair (or hairline) and a single horizontal crosshair (or hairline), which intersects the vertical hairline near the visual center of the reticle. The point of intersection of these crosshairs constitutes the primary sighting point for the scope, representing the site of bullet impact at a chosen (zero) distance. The gunsight is moveable in vertical and horizontal directions by way of calibrated adjustment screws on the exterior of the scope (internal adjustments), or on the scope attachment system (external adjustments).

By firing a series of shots while making compensatory adjustments of the relative position of the gunsight and thus of the reticle center point, the shooting system comprised of rifle, bullet type, scope and shooter are "zeroed in" so that the position on the target of the crossed hairlines or center point of the reticle coincides with the point of bullet impact.

In certain scope sighting systems the reticle has a series of evenly spaced secondary horizontal hairlines that intersect the vertical hairline below the center horizontal hairline. In those systems, the respective points of intersection of the secondary hairlines with the vertical hairline are typically used to estimate bullet impact points at distances progressively greater than that at which the rifle was "zeroed in" with the main (center) horizontal crosshair. However, in order to utilize the secondary crosshairs with accurate results, the shooter must know with some precision the distance from gun to target.

Various types of range finder systems have been disclosed for telescopic gunsights. For example, U.S. Pat. No. 1,190, 121 to Critchett discloses a reticle having a series of target-spanning rulings disposed above a baseline, the rulings corresponding to associated shooting distances. In use, the shooter ascertains which ruling above the baseline makes the most closely embracing fit on the target, thereby determining the shooting distance (target range). A separate crosshair aiming point is included in the reticle for use in association with each chosen ruling above the baseline.

The principle of the Critchett target-spanning rulings is that certain targets are of known, or at least estimable size. For instance, it is a fairly accurate estimate that for mature deer or antelope, the distance between the top of the back at the shoulders and the bottom of the chest cavity is about 18 inches. The target-spanning rulings are spaced apart such as to span a known target size at a known range. This manner of distance measurement is consistent with conventional trigonometric considerations wherein the triangle defined by the height of the target and the viewing angle through the telescope's optical system can be considered a right triangle, which accordingly establishes the length of the base line distance to the distal side of the triangle, namely the distance to the target.

U.S. Pat. No. 3,392,450 to Herter et. al. discloses a reticle having a series of target-spanning circles of different diameters which correspond to associated shooting distances. Employing the same basic distance-measuring concept as Critchett, the shooter employs for aiming purposes, that crosshair which corresponds to the selected circle.

U.S. Pat. No. 3,190,003 to O'Brien concerns a range-finding reticle for a telescopic gunsight having single centered vertical and horizontal hairlines. The portion of the vertical hairline below the horizontal centerline is provided with widened bar regions extending various lengths below the centerline. Each bar subtends a target of known size. By finding which widened region corresponds to the height of the target, the shooting distance is estimated.

U.S. Pat. No. 3,431,652 to Leatherwood discloses a telescopic gunsight wherein the distance to the target is determined by movement of upper and lower horizontal hairlines along a fixed vertical hairline in a manner so as to bracket the target. Once bracketed, the intersection of the lower horizontal hairline with the vertical hairline serves as the crosshair aiming point. In this aiming process, the alignment of the scope changes with respect to the gun barrel, whereby the allowance for distance is achieved when the centered crosshair is sighted directly on the target.

U.S. Pat. No. 3,492,733 to Leatherwood discloses a distance measuring system for a variable power telescopic sight that is pivotally moveable in a vertical plane with respect to the gun barrel upon which it is mounted. Cams within the scope and rotatable by external means achieve vertical movement of the scope so that horizontal framing hairlines will fit the target. A specialized cam must be installed into the scope for each particular type of ammunition employed.

U.S. Pat. No. 3,948,587 to Rubbert concerns a variable power telescopic sight having a reticle provided with a vertical hairline, a center horizontal hairline and three horizontal framing lines disposed below the center horizontal hairline. Aiming is achieved by positioning either the center crosshair or lower crosshairs on the target, as dictated by the observed fit of the target within the framing lines.

U.S. Pat. No. 4,403,421 to Shepherd discloses a telescopic gunsight having spaced apart primary and secondary reticles which are moveable relative to each other. The secondary reticle is also moveable vertically and horizontally within the plane of the reticle. The moveable two reticle system facilitates adjustments for windage and elevation. Distance to the target is ascertained by framing indicia on the secondary reticle.

The telescopic sights disclosed in the aforementioned prior art patents are often of limited usefulness insofar as they do not address many of the several factors that need to be considered in the accurate aiming of a rifle under field conditions. Such factors include:

a) distance to target
b) drop of bullet caused by force of gravity
c) hold-over or hold under points
d) wind drift correction
e) correction for phenomenon associated with gyroscopic forces on a gyroscopically stabilized bullet (sometimes referred to as)
   1) Yaw of Repose effects (vertical displacements)
   2) Magnus effects (horizontal displacements)

These latter result from the effect of cross-wind or shooting either up-hill or down-hill.

Older reticle systems often require that the shooter look away from the target in order to make compensating adjustments. Some of these designs may render the scopes difficult or slow to use, and some require moveable mounting on the rifle, a situation which subjects the scope to inaccuracy after repeated use or abuse in rugged field conditions. Moreover, correct use of any of these systems requires the shooter to manage extraordinary mental work.

SUMMARY OF THE INVENTION

The present invention is embodied in a reticle for a gunsight and a precise method for using the reticle to measure distance to any size target, to provide precise drop compensation aiming points for up to approximately 400 yards beyond any high velocity bullet's normal point-blank (zero) range, to provide precise compensation for cross-winds and up-hill or down-hill shooting conditions, and to provide an accurate lead point for moving targets, thereby providing an accurate and effective method for aiming the rifle, all with easy and fast mental work that does not require extraordinary effort by the shooter or any knowledge of the particular ballistic characteristics of load or gun used.

The telescopic sighting system incorporates an optical system comprised of a forward objective lens element, a rear eyepiece lens element and intervening erector lens element, the elements being protectively confined within an elongated tubular housing adapted to be affixed to a firearm such as a hunting rifle. The improvement provided by the present invention comprises the addition into said optical system within said housing of a transparent reticle having indicia which simultaneously provides accurately both the function of distance measuring and the range specific aiming function. The reticle is positioned between the objective lens element and the erector lens element. The indicia incorporates orthogonally intersecting center vertical and horizontal hairlines, and four horizontal range marker and wind bar lines disposed below the center horizontal hairline with very specific vertical spacings and intersecting in a bisected relation the center vertical hairline.

The specific and precise configuration and positioning of the range marker and wind bar lines enables the shooter to mentally compute the range to the target and allow for bullet drop, drift, gyroscopic effects, up-hill or down-hill angle shots and target lead. With modest practice, a typical shooter can learn to accomplish these tasks within in a split-second. The specific ratio of the spacings of these secondary indicia is critical to the functionality of this system. The accuracy achieved by this reticle promotes shooter confidence which in turn lead to shooter proficiency.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 12 illustrates the reticle depicted in the form of a decal for taping upon the objective extremity of the scope. The left-hand Grid Line column serves as a reminder to denote the actual number of lines with which to divide into the animal's or target's outline for height measurement When determining distance to target, the upper right column, Aiming Point at level angle, denotes bullet impact point for a "6 Factor" rifle zeroed or sighted-in at 200 yards. Using the grid line center point, at 100 yards the bullet impact will be 1.84 inches (about 2 inches) high, and at 200 yards the impact point will be on target (zeroed)—200 yards is a typical "zeroing" range for such a rifle and load. At 300 through 600 yards the lower indicia (crosshairs) provide a precise aiming point at each respective stated distance (progressively, 300, 400, 500 and 600 yards) to give the desired impact point. The upper center column, Aiming Point Grid Line at 45 degree Angle, denotes the angle correction when shooting uphill or downhill. For a "6 Factor" rifle, simply move up the equivalent of one crosshair (about 2" of angle subtention) for a 45° angle shot.

DESCRIPTION OF THE PREFERRED EMBODIMENT

Figure 1:
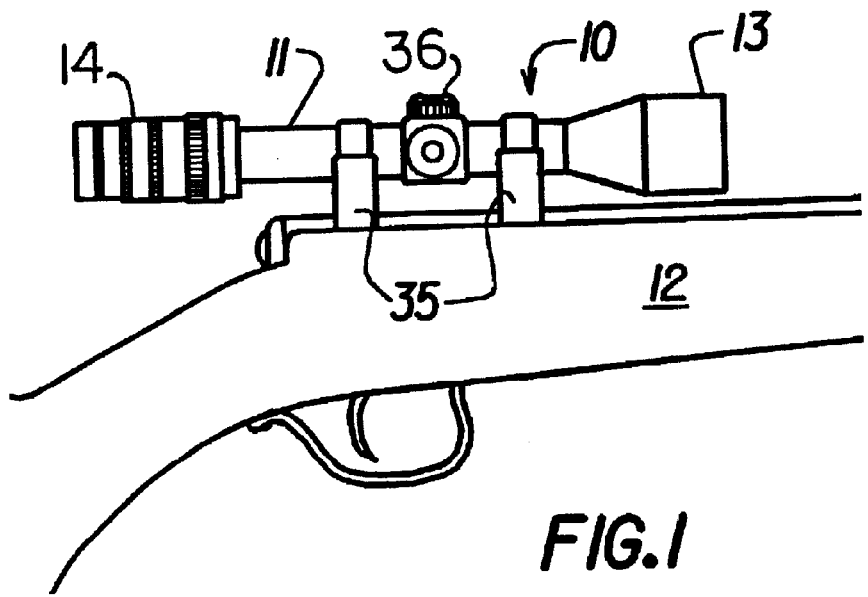
FIG. 1 is a side elevation view of a telescopic sight embodying the present invention mounted upon a rifle of the type commonly used for hunting, target shooting and related practices.
Figure 2:
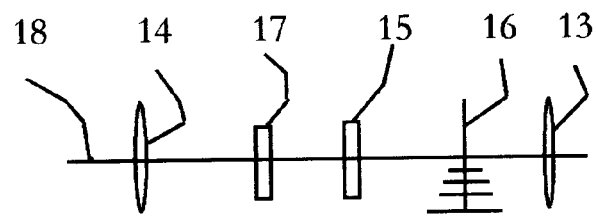
FIG. 2 is a schematic illustration of the internal components of a variable power telescopic sight of the type shown in FIG. 1.
Figure 3:
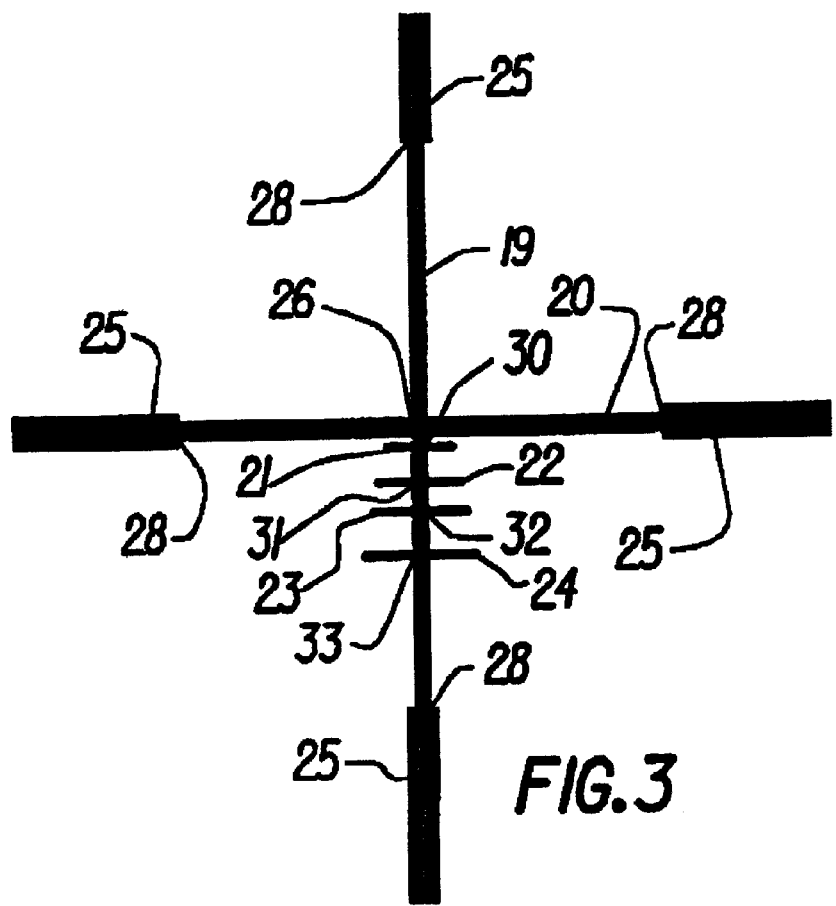
FIG. 3 is an enlarged view showing an aiming reticle component of the sight of FIG. 1 as it appears to the user of the sight.

Referring to FIGS. 1–3, a telescopic sight 10 embodying this invention is shown attached by a suitable mount 35 to a rifle 12. The sight 10 is formed by a tubular housing 11 containing a forwardly positioned objective lens element 13, a rearwardly positioned ocular or eyepiece lens element 14, an intervening erector lens element 15, and a reticle 16 disposed between the objective lens element 13 and the erector lens element 15. In the case of vari-focal or zoom scopes, a positionally adjustable magnifying lens 17 is associated with the erector lens element 15. The exterior of the housing 11 may be equipped with rotationally moveable features 36 for adjusting focus, magnification ratio, windage and elevation. The various lenses elements may be single lenses or combinations of lenses.

The reticle 16 is a circular, planar or flat transparent panel or disk mounted within the housing 11 in perpendicular relationship to the optical axis or line of sight 18 of the scope, and is positioned between the objective lens element 13 and the erector lens element 15 at a site considered to be a front focal plane of the optical system within the housing. The reticle 16 contains fine line or hairline indicia comprising a center vertical hairline 19 and a center horizontal hairline 20, which orthogonally or perpendicularly intersect at a center point 26. The reticle further defines first, second, third and fourth horizontal range and aiming marker hairlines 21, 22, 23 and 24 respectively intersecting the vertical hairline below the center point 26 and vertically spaced apart and of sequentially increasing length. Each such range and aiming marker hairline 21, 22, 23, and 24 is bisected by the center vertical hairline 19.

Each combination of a rifle and bullet or cartridge must be initially sighted in at 200 yards or other selected basic zero range, which depends critically upon the ballistic characteristics of the specific bullet. The center point 26 then represents the basic sighted-in bullet impact point. The points of intersection of said first, second, third and fourth range marker lines 21, 22, 23, and 24 with said vertical hairline, designated first, second, third and fourth alternative aiming points 30, 31, 32 and 33, respectively, represent sighted-in bullet impact points at distances that are a function of bullet trajectory for the specific load used. For example, for a bullet and rifle determined to be a "6 factor" system as will be explained, the aiming points are for distances of 300, 400, 500 and 600 yards, respectively. A "6-factor" rifle and bullet combination is a system that produces a 6 inch drop from a "sight-in" impact point at 200 yards to the bullet impact point when the same combination of rifle and bullet is fired at 300 yards using the center point 26 as the aiming point. Bullets of different characteristics and different rifle and bullet combinations will produce different "factors." Thus the aiming points 30, 31, 32 and 33 will correspond to different distances or ranges, which the shooter, knowing the characteristics of the bullet, will take into consideration when aiming and firing. The aiming points 30, 31, 32 and 33 are useful because the trajectory curves of different bullets are similar, even though the bullets travel different distances—some similar-length section of each curve, whether closer to the gun or further from the gun, will have a sufficiently similar shape to allow accurate use of this system.

The radially outer or distal portions of the center vertical hairline 19 and center horizontal hairline 20 are widened to form relatively wider or heavy posts 25 whose radially directed innermost extremities 28 are disposed on a circular locus about the center point 26.

The various dimensions and spaced relationships of the indicia on the reticle 16 are conveniently expressed as inches of subtention or angle at 100 yards rather than the actual engraved dimensions on the reticle lens itself. Accordingly, the width of each of the posts 25 is 5.5 inches of subtention, and the width of the hairline portions of the center vertical and center horizontal hairlines 19 and 20, respectively, is 0.6 inches of subtention. The distance between the center point 26 and the innermost extremities 28 of the posts 25, that is the length of the center vertical and horizontal hairlines 19, 20, respectively, is 25 inches of subtention.

The distances or width of the separation between the horizontal hairline 20 and the first, second, third and fourth range lines 21, 22, 23, and 24 below the center point 26 are 2.0, 4.8, 7.5 and 10.5 inches of subtention, respectively. The four marker lines are of equal 0.3 inch of subtention width and are preferably straight and orthogonally or perpendicularly bisected by the lower half or lower portion of the center vertical hairline 19. The lengths of the first, second, third and fourth range marker lines are 4.12, 5.90, 8.32 and 9.72 inches of subtention, respectively. The foregoing dimensions are empirically derived and are critical to the accuracy and ease of use of this system—these datum are fundamental to the concept.

The "factor" for a particular rifle and bullet combination is determined by sighting it in at 200 yards using the center point of the reticle. Using the same 200 yard sight center point, a group of shots is then fired at 300 yards and average drop (in inches) is measured. This figure becomes the "factor" that is used to compute vertical bullet drop, wind drift deflection, both horizontally and vertically, and gravity correction for both up hill and down hill angle correction.

Bullet drop is progressively curvilinear, and is predictable out to about 0.72 seconds of free flight (450 yards for a 0.308 Winchester; 500 yards for a 30/06; 600 yards for a 7 mm. Remington Magnum; and 700 yards for a 30/378; all with high energy maneuverability bullets—traditionally known as bullets having a streamlined shape and a relatively high ballistic coefficient). Bullet drop for a 6-factor rifle and bullet combination for example, results in a 6-inch drop at 300 yards. This factor is tripled for the 400-yard bullet drop. This 400-yard drop is doubled for 500 yard drop. For 600-yard drop, the 500 yard drop is doubled and ten is subtracted from that result. This matches up with the specific angular spacings of the indicia.

For instance, a 6-factor bullet (150 grain 7 mm. Remington Magnum fired at 3,200 fps) computes thusly:

a. 300 yard drop: 6"
b. 400 yard drop: 3×6=18"
c. 500 yard drop: 18×2=36"
d. 600 yard drop: 36×2=72−10=62"

In other words, for a 6-factor rifle and bullet that is zeroed at 200 yards, the bullet drops 6" @ 300 yards, 18"@ 400 yards, 36" @ 500 yards, and 62" @ 600 yards.

A reticle embodying the present invention having the above characteristics and dimensions, will produce sufficiently accurate shots when using the respective reticle aiming points at the determined distances. For rifle and bullet combinations that have a factor other than six, center impact distances corresponding to the various aiming points must be calculated accordingly. See Table 1.

Figure 4A:
FIGS. 4A, 4B and 4C illustrate the use of calibration grids for learning the use of the scope of this invention.
Figure 4B:
Figure 4C:
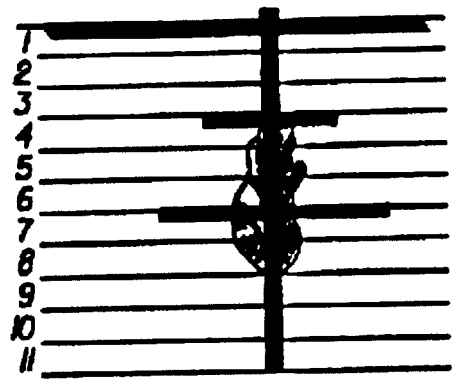

The use of the scope of this invention for measuring target distance may best be visualized by referring to the grid line charts as shown in FIGS. 4A, 4B and 4C. Each grid line chart consists of a series of numbered horizontal straight lines sequentially spaced an inch apart (inch of subtention at 100 yards or approximately one minute of angle) and assumed to be visibly distinct in the scope at the indicated ranges. A target such as a 9-inch tall prairie dog is drawn to occupy the top nine lines of a chart, as shown in FIG. 4A, and assumed to be placed at a range of 100 yards. The scope is then sighted onto said 100 yard target, producing the view shown in FIG. 4B wherein the top of the prairie dog is placed at the center point 26, and the bottom of the prairie dog falls between the third and fourth range marker lines, namely between 7.5 and 10.5 inches of subtention from the center point 26. By interpolation, the bottom of the target, having an actual height of 9 inches, is 9 inches of subtention from the center point 26. It is accordingly ascertained that the 9-inch high prairie dog target is located at a shooting range of 100 yards.

It should be noted that the target heights subtended by the horizontal range marker lines increase in direct arithmetic proportion to the distance of the target from the rifle. Therefore, at 200 yards, the first, second, third and fourth range marker lines measure targets of 4, 10, 15 and 21 inch actual heights (rounded), respectively. At 300 yards, the first, second, third and fourth range marker lines measure targets of 6, 15, 22.5 and 31.5 inch actual heights (rounded) respectively. At 400 yards, the first, second, third and fourth range marker lines measure targets of 8, 20, 30 and 42 inch actual heights (rounded) respectively.

When the same 9-inch prairie dog target is viewed for example at 300 yards, the view through the scope is as shown in FIG. 4C, wherein the target appears much smaller because of the distance at which it is located, and the range marker lines now correspond to progressive actual heights of 6, 15, 22.5 and 31.5 inches respectively in descending order down said center vertical hairline. Now, with the top of the head of the target at the center point, the bottom of the target will be located between the first and second range marker lines. This position corresponds to 3 inches actual height at 100 yards or 9 inches actual height at 300 yards. It follows, that knowing the actual height of the target, one can easily determine target range. In other words, in order to determine distance to target, target height is divided by inch reading on reticle. In the example of FIG. 4C, the 9 inch target would measure 3 inches on the reticle; accordingly, target range is 9÷3=3 (×100), or 300 yards.

Once target range has been determined, and when one knows the factor of the rifle and bullet being used, the scope can be accurately aimed by centering the appropriate indicia along the vertical hairline upon the desired location of bullet impact. For example, with a "6-factor" rifle and bullet combination, and having ascertained that the target is located at 300 yards, and knowing that the main reticle center point 26 is for a 200 yard range, the next lower aiming point, consisting of the point of intersection 30 of the vertical crosshair 19 with the first range marker 21, corresponding to 300 yards, is, under ideal conditions and with a stationary target, used as the aiming point for a direct hit.

Figure 5:
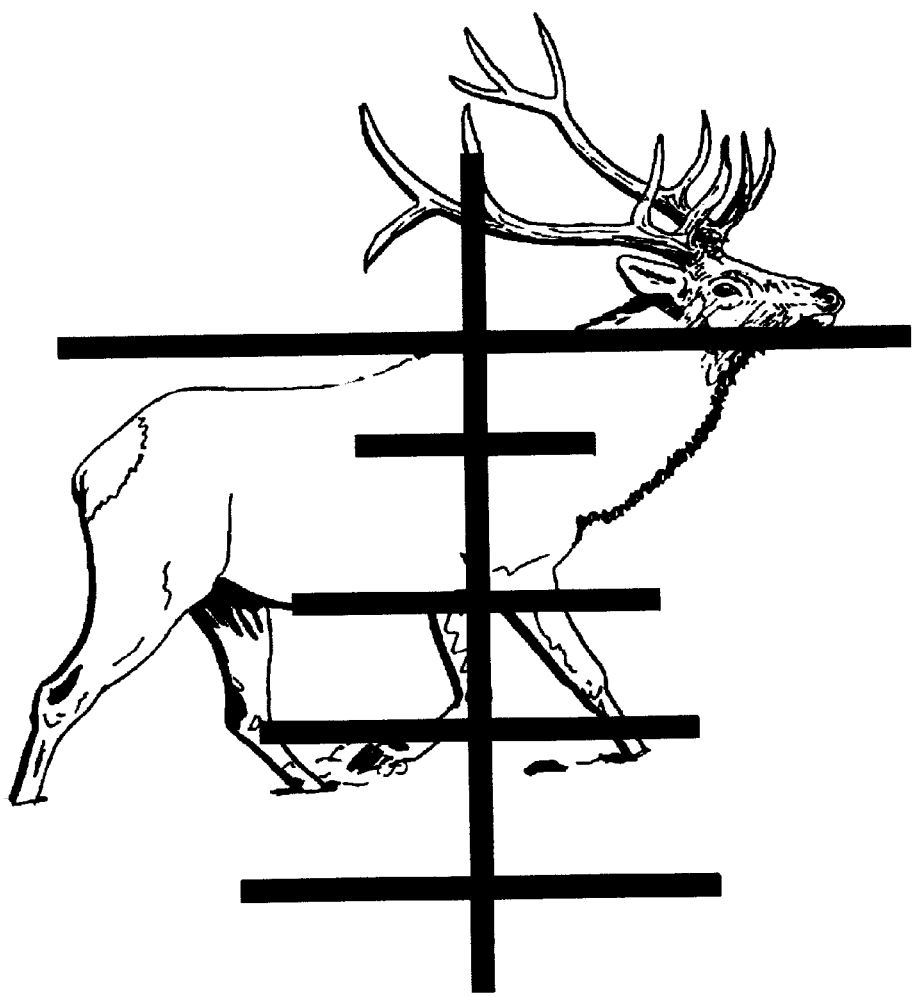
FIG. 5 illustrates the use of the scope of this invention on large targets.

Use of this reticle with respect to a Rocky Mountain Elk having an estimated 25 inch chest height is illustrated in FIG. 5. It is seen that the 25 inch chest is spanned by about 5 inches of subtention of reticle distance. Accordingly, the range is 25÷5=5 (×100), or 500 yards, and aiming point 32 is employed for shooting, centered upon target, again this assumes a "6-factor" rifle and bullet combination, ideal conditions and a stationary target.

Compensation must be made for bullet deflection due to wind drift. To this end, the rifle must be pointed into the wind. This is accomplished by moving the reticle aiming point in the opposite direction an appropriate amount. For this purpose, the applicable "factor" becomes the 10 mph wind correction or drift, applied in a linear manner.

a. at 300 yards the drift is 6";
b. at 400 yards the drift is 6+6=12";
c. at 500 yards the drift is 12+6=18";
d. at 600 yards the drift is 18+6=24".

For a 5 mph wind, the drift values would be one-half the 10 mph values, and a 20 mph wind would require twice the 10 mph values.

Figure 6A:
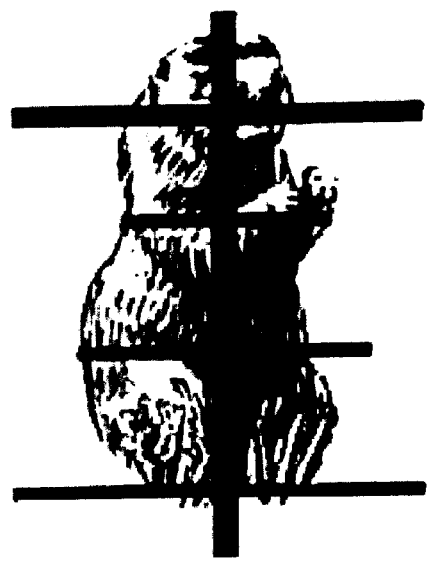
FIGS. 6A and 6B illustrate the use of the scope of this invention on a small target.
Figure 6B:
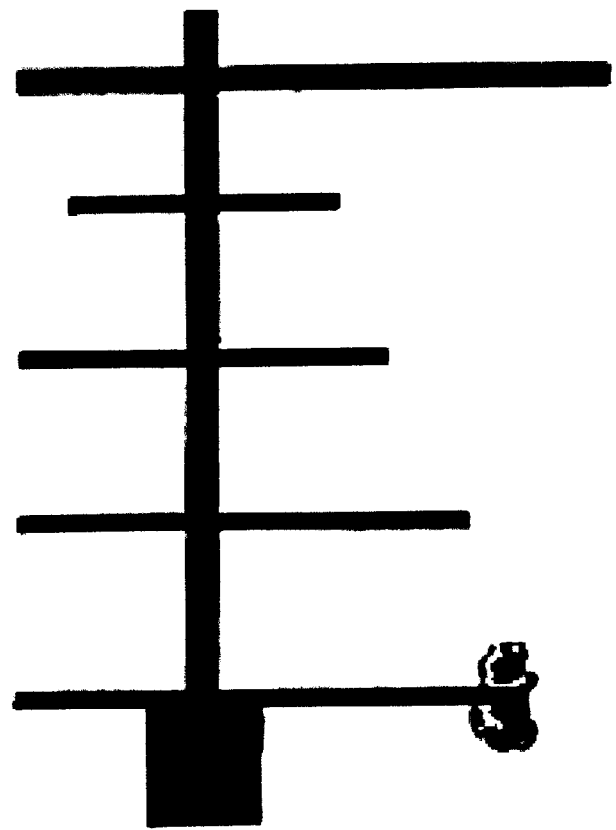
Figure 7:
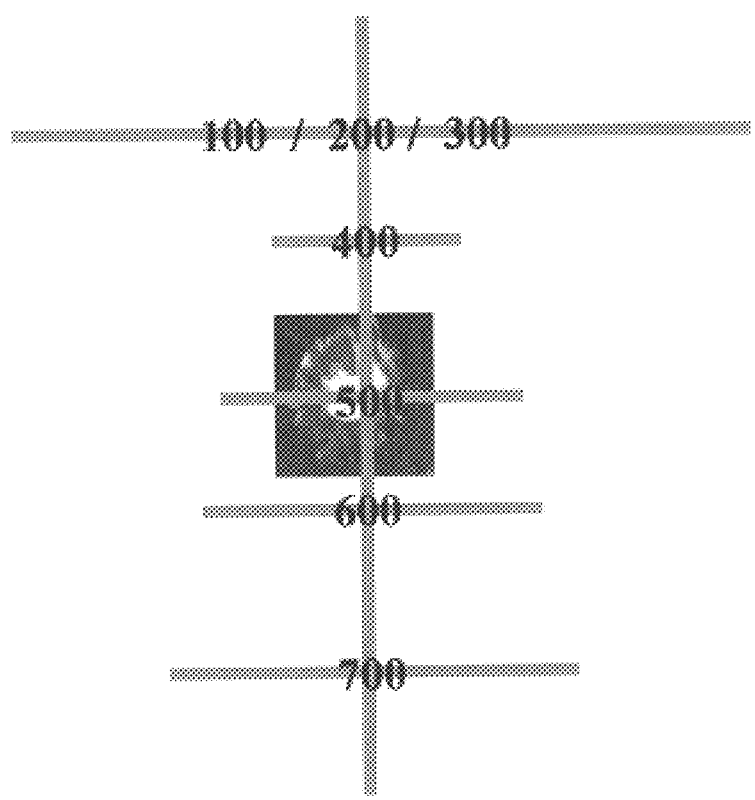
FIGS. 7–11 exemplify sighting images perceived by the shooter in various shooting situations.
Figure 8:
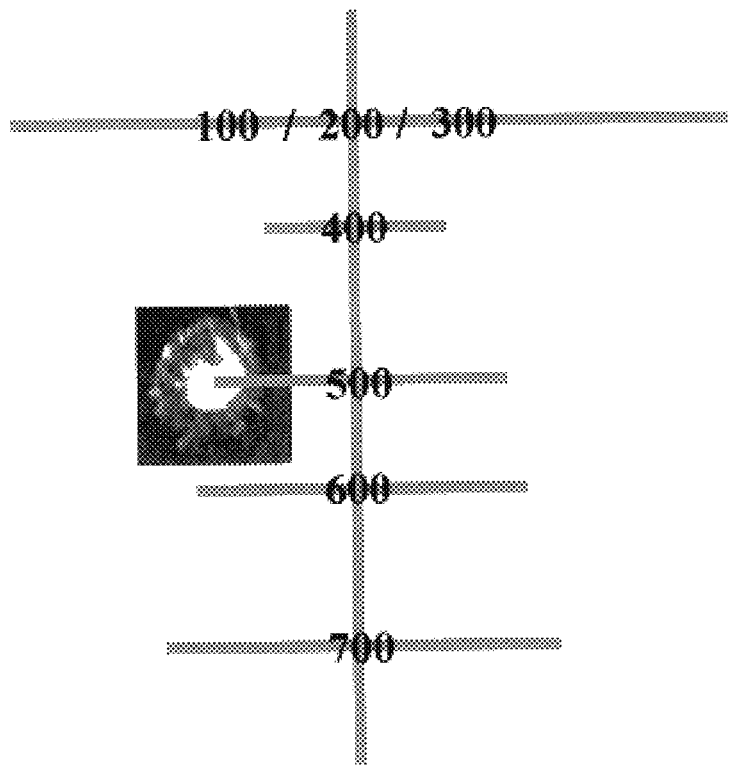
Figure 9:
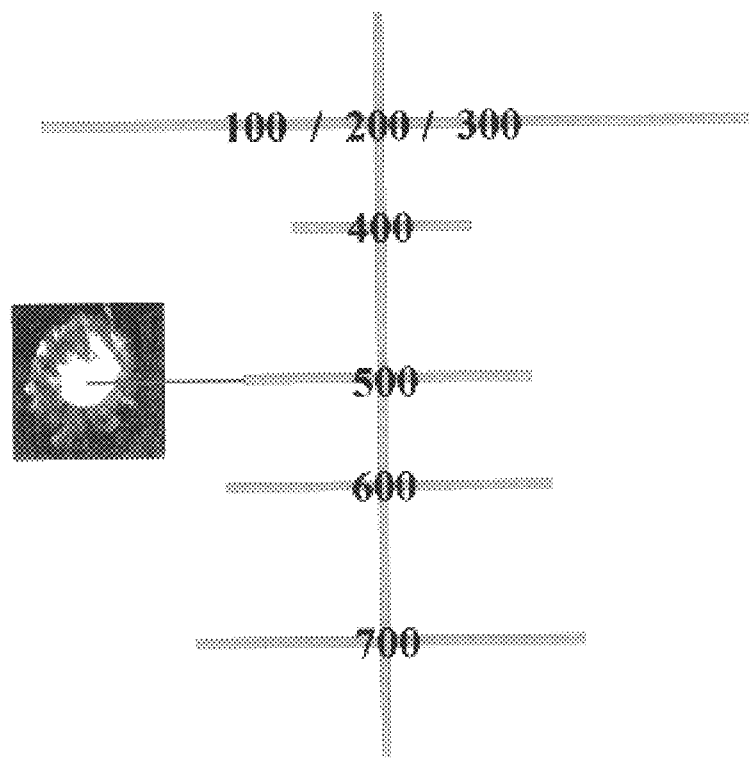

The sight picture for shooting at a 9-inch high prairie dog at 100 yards is illustrated in FIG. 6A. The sight picture for shooting at a 9-inch high prairie dog at 600 yards with a 10 mph left crosswind is illustrated in FIG. 6B. The view through the scope when shooting at a target at 500 yards is illustrated in FIG. 7. FIGS. 8 and 9 illustrate adjusted aiming points to compensate for 10 mph and 20 mph right-to-left crosswinds, respectively. For this purpose, the ends of the range marker lines, having the above lengths, constitute aiming points to compensate for 10 mph winds at the respective ranges. Length of the range marker bars on each side of the vertical centerline are one half the total length or 2.06, 2.95, 4.16 and 4.86 inches of subtention at 100 yards respectively.

Compensation must also be made for the effect on the path of the bullet of the spinning thereof. The rifleman's idiom designates this as a "Magnus effect." It may also be referred to as "Yaw of Repose." these are the vertical and horizontal elements of deflection in a cross-wind when considering a gyroscopically spinning body or missile.

Figure 10:
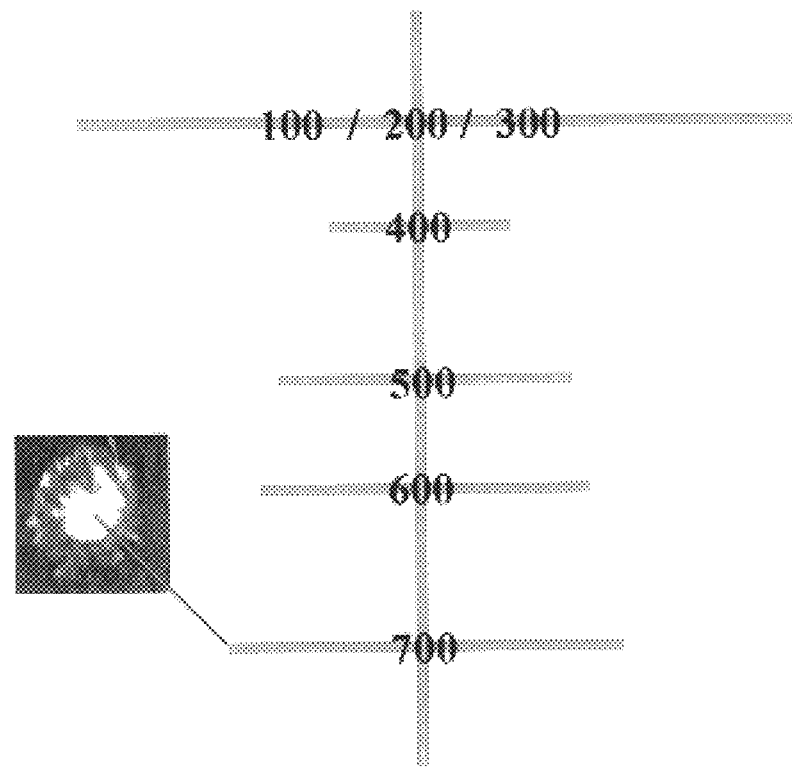

The formula for compensating for the potential worst case effect of Magnus is to adjust ¼th the total value by sliding that point onto the target. In the illustration of FIG. 10, there is shown the aiming point as an interpolated point left one equal wind bar (10 mph) and ¼above the left tip of the third range marker line. (Unusually low-rag high-speed bullets may react to Magnus only a small percentage of the adjustment in FIG. 10; however, hunting bullets do not fall into this category.) The rule is to construct a "kill zone" on the target and then hold "worst and best" Magnus movement so that the bullet is aimed with sufficient accuracy to intersect the kill zone.

Computing simultaneous Magnus and Yaw of Repose values and crosswind values:

1. With conventional (right-hand) twist barrels, these effect make the bullet rise with a right-to-left crosswind, drop with a left-to-right crosswind.

2. Add ¼th the horizontal value vertically to the final aiming point using the reticle wind bar as a transparency overlay.

Figure 11:
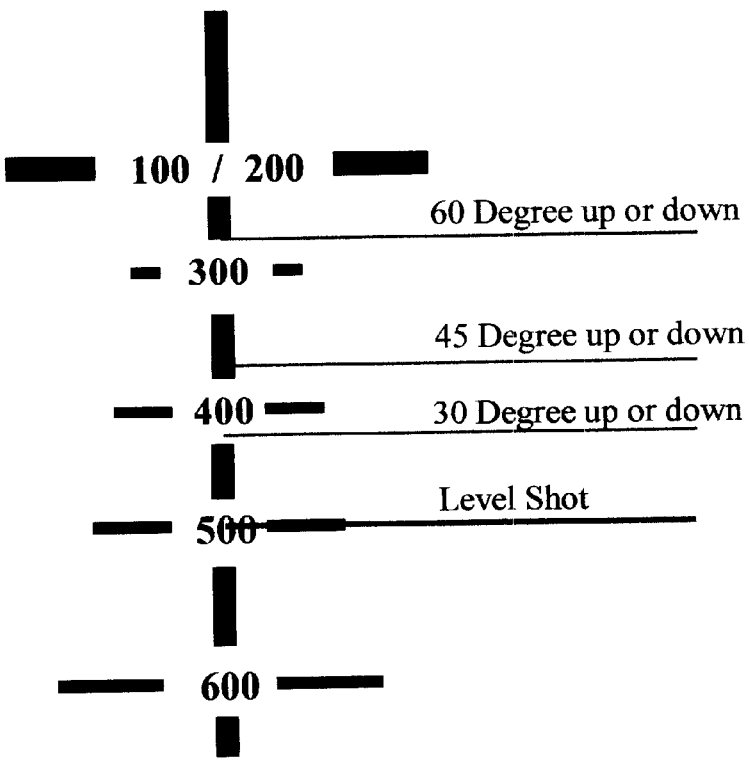

When shooting uphill or downhill, bullet impact point will be higher than when shooting level at the same total target distance. In other words, when computing uphill or downhill gravity values, it must be noted that angle shots require less hold-over, that is the aiming point is moved upwardly on the reticle, because of a lesser gravity pull although bullet drag remains the same. A sight picture and aiming point for a "6-factor" rifle and bullet at a 45° up-hill shot at 500 yards slant range is illustrated in FIG. 11. The appropriate sighting adjustment in such situation is to move up one range marker line for a 45 degree angle, twice that or two range marker lines for a 60 degree angle, and one half that or up one-half the distance between appropriate range marker lines for a 30 degree angle.

The formula or adjustment for a 60° angle shot, for example, is as follows:

a. at 200 yards, raise the aiming point an amount equal to ⅔rds of the factor, or 4";
b. at 300 yards, double the 200-yard value, or 8";
c. at 400 yards, double the 300-yard value, or 16";
d. at 500 yards; double the 400-yard value, or 32".

The reticle of the present invention performs with each rifle and bullet with the same precise degree of accuracy. The shooter is thus provided a similar but unique reticle decal for each combination.

While a single reticle constructed as described above may be used for most rifle and bullet combinations, specialized reticles may be needed for certain particular rifle and bullet or cartridge combinations and scope magnifications. Therefore, the ratios of indicia spacings and lengths are not unique and other ratios of and lengths can have value for specific unusual applications. This is a parametric design issue and the critical factor of interest is that specific ratios of spacings and lengths are required to produce useful results.

It is further to be noted that with this design the shooter need not divert attention from the image in the scope for first determining distance and other corrections and second for finding the proper aiming point.

The telescopic gunsight of this invention is particularly well suited for shooting at moving targets. It is generally known that a deer starts running at about 12.5 mph. The distance between the reticle center point 26 and the innermost extremities 28 of the posts 25 compensates for a target moving at 12.5 mph. Further adjustments can be readily made for targets moving at other estimated speeds and angles, in direct proportion to the 12.5 mph speed adjustment.

The final sight picture provided by the reticle embodying the present invention, corrected for range, wind, external ballistics, and target movement results in a straight line aim and shot at the target in the same manner as a point blank range shot. This enables the shooter to have much more confidence in the result and therefore to more easily achieve accurate shot placement.

Using a reticle of the present invention, observing the target conditions, and applying the foregoing calculations, an aiming point on the reticle is mentally selected and centered on the desired target impact point. This can be done quickly with little stress or doubt than with other systems. The shooter can then concentrate on firing the rifle in a relaxed mode with a minimum of movement or "jerk" of the rifle and then "look the bullet into" the target—this is otherwise called "follow through" and is critical to marksmanship.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of this invention.

What is claimed is:

1. A method of aiming a rifle equipped with a telescopic gunsight having an optical system comprised of a forward objective lens element, a rear eyepiece lens element and intervening erector lens element, said elements being aligned upon an optical axis constituting a line of sight and protectively confined within an elongated tubular housing adapted to be securely affixed to a rifle, a transparent reticle in said optical system between said objective and erector lens elements, said transparent reticle having distance-measuring and aiming indicia, said indicia comprising a center vertical straight hairline and a center horizontal straight hairline, said center vertical and center horizontal hairlines intersecting perpendicularly, and four straight horizontal range-marker hairlines of sequentially incremental length disposed below said center horizontal hairline in vertically bisected relationship with said center vertical hairline, the method comprising:
    a) determining the distance to the target employing said reticle, which is placed adjacent to the objective lens, and
    b) using said determined distance and said reticle range marker hairlines to ascertain a precise aiming point on said reticle for aiming said rifle at the target.

2. A method of aiming a rifle equipped with a telescopic gunsight having an optical system comprised of a forward objective lens element, a rear eyepiece lens element and intervening erector lens element, said elements being aligned upon an optical axis constituting a line of sight and protectively confined within an elongated tubular housing adapted to be securely affixed to a rifle, a transparent reticle in said optical system between said objective and erector lens elements, said transparent reticle having distance-measuring and aiming indicia, said indicia comprising a center vertical straight hairline and a center horizontal straight hairline, said center vertical and center horizontal hairlines intersecting perpendicularly and each having radially distal portions which are widened to form posts having radially directed innermost and outermost extremities, and four straight horizontal range-marker hairlines of sequentially incremental length disposed below said center horizontal hairline in vertically bisected relationship with said center vertical hairline, the method comprising:
    a) determining the distance to the target employing said reticle, which is placed adjacent to the objective lens, and
    b) using said determined distance, said reticle range marker hairlines and said posts to ascertain a precise aiming point on said reticle for aiming said rifle at the target.

3. A method of aiming a rifle equipped with a telescopic gunsight having an optical system comprised of a forward objective lens element, a rear eyepiece lens element and intervening erector lens element, said elements being aligned upon an optical axis constituting a line of sight and protectively confined within an elongated tubular housing adapted to be securely affixed to a rifle, a transparent reticle in said optical system between said objective and erector lens elements, said transparent reticle having distance-measuring and aiming indicia, said indicia comprising a center vertical straight hairline and a center horizontal straight hairline, said center vertical and center horizontal hairlines intersecting perpendicularly and each having radially distal portions which are widened to form posts having radially directed innermost and outermost extremities, and four straight horizontal range-maker hairlines of sequentially incremental length disposed below said center horizontal hairline in vertically bisected relationship with said center vertical hairline, the method comprising:
    a) determining distance to target employing said reticle;
    b) determining correction for wind of known (or estimable) speed and direction;
    c) determining correction for magnus and yaw of repose effects on bullet;
    d) determining correction for uphill or downhill shooting angle;
    e) determining correction for target speed and direction;
    f) using said determined distance, estimated wind speed and direction, estimated magnus effect, estimated uphill or downhill angle, estimated target speed and direction, and said reticle range marker hairlines and said posts to ascertain a precise aiming point on said reticle for aiming said rifle at the target with sufficient accuracy to produce the desired shot placement.

4. A telescopic gunsight having an optical system comprising a forward objective lens element, a rear eye-piece lens element and an intervening erector lens element aligned along an optical axis constituting a line of sight and protectively confined within an elongated tubular housing adapted to be securely affixed to a rifle for shooting a bullet at a target, a transparent reticle in said optical system between said objective and erector lens elements, said reticle having distance-measuring and aiming indicia thereon, said indicia comprising a center vertical straight hairline and a center horizontal straight hairline, said center vertical and center horizontal hairlines intersecting perpendicularly, and four straight horizontal range-marker hairlines of sequentially increasing incremental lengths disposed below said center horizontal hairline and parallel thereto and in vertically bisected relationship with said center vertical hairline, the vertical spacing of said range-marker hairlines below said center horizontal hairline being proportional to the drop of said bullet at regularly increased uniform target ranges.

5. A telescopic gunsight as defined in claim 4 wherein said target ranges are 300 yards, 400 yards, 500 yards and 600 yards respectively but where other ranges are appropriate for other types of guns and loads.

6. A telescopic gunsight as defined in claim 5 wherein the spacing of said range marker hairlines below said horizontal center hairline are 2.0, 4.8, 7.5, and 10.5 inches of subtention at 100 yards respectively but where other spacing ratios can be applied to specific other types of guns and loads for special or unique situations.

7. A telescopic gunsight as defined in claim 4 wherein the lengths of said range-marker hairlines on either side of the center vertical hairline are proportional to the effect of a 10 mph wind on said bullet at the respective target ranges but where other lengths can be used for specific other applications.

8. A telescopic gunsight as defined in claim 7 wherein the lengths of said range marker hairlines on either side of the center vertical hairline are 2.06, 2.95, 4.16 and 4.86 inches of subtention at 100 yards respectively but where other lengths can be used for specific other applications.

9. A telescopic gunsight having an optical system comprising a forward objective lens element, a rear eyepiece lens element and an intervening erector lens element aligned along an optical axis constituting a line of sight and protectively confined within an elongated tubular housing adapted to be securely affixed to a rifle for shooting a bullet at a target, a transparent reticle in said optical system between said objective and erector lens elements, said reticle having distance-measuring and aiming indicia thereon, said indicia comprising a center vertical straight hairline and a center horizontal straight hairline, said center vertical and center horizontal hairlines intersecting perpendicularly and each having radially distal portions which are widened to form posts having radially directed innermost and outermost extremities, and four straight Horizontal range-marker hairlines of sequentially increasing incremental lengths disposed below said center horizontal hairline and parallel thereto and in vertically bisected relationship with said center vertical hairline, the vertical spacing of said range-marker hairlines below said center horizontal hairline being proportional to the drop of said bullet at regularly increased uniform target ranges.

10. A telescopic gunsight as defined in claim 9 wherein the lengths of said range-marker hairlines on either side of the center vertical hairline are proportional to the effect of a 10 mph wind on said bullet at the respective target ranges but where other lengths can be used for specific other applications.

11. A telescopic gunsight as defined in claim 9 wherein the distance of the innermost points of the posts on the center horizontal hairline from the center vertical hairline is directly proportional to the speed of a running animal but where other lengths can be used for specific other applications.

* * * * *